United States Patent
Villarroel et al.

(12)

(10) Patent No.: US 6,652,031 B2
(45) Date of Patent: Nov. 25, 2003

(54) RECLINER ASSEMBLY HAVING A SHAFT WITH AN ANNULAR RECESS

(75) Inventors: Randy Villarroel, Brampton (CA); Pius Ng, Markham (CA)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 09/765,983

(22) Filed: Jan. 19, 2001

(65) Prior Publication Data

US 2002/0096922 A1 Jul. 25, 2002

(51) Int. Cl.$^7$ ................................................. B60N 2/02
(52) U.S. Cl. ....................................................... 297/367
(58) Field of Search ................................ 297/366, 367, 297/362, 361.1

(56) References Cited

U.S. PATENT DOCUMENTS

| | | | |
|---|---|---|---|
| 5,209,637 A | | 5/1993 | Reubeuze |
| 5,681,086 A | | 10/1997 | Baloche |
| 5,755,491 A | | 5/1998 | Baloche et al. |
| 5,769,494 A | * | 6/1998 | Barrere et al. |
| 6,039,441 A | | 3/2000 | Tomikawa et al. |
| 6,283,886 B1 | * | 9/2001 | Schumann |

FOREIGN PATENT DOCUMENTS

WO    PCT/CA99/00653    7/1999

* cited by examiner

Primary Examiner—Milton Nelson, Jr.

(74) Attorney, Agent, or Firm—Clark Hill PLC

(57) ABSTRACT

A recliner assembly for operatively interconnecting a seat back and a seat cushion allowing pivotal adjustment of the seat back relative to the seat cushion. The recliner assembly comprises an inner disc fixedly secured to the seat cushion and an outer disc fixedly secured to the seat back. The outer disc is rotatably nested within the inner dis and includes an annular rim of gear teeth extending radially inwardly. At least one pawl is adapted for lockingly engaging the annular rim of gear teeth on the outer disc and is disposed between the inner and outer discs. The pawl is radially moveable between a locked position, wherein the pawl is lockingly engaged with the annular rim of gear teeth on the outer disc, and an unlocked position, wherein the pawl is disengaged from the annular rim of gear teeth on the outer disc. A biasing member extends between the pawl and the inner disc for biasing the pawl in the locked position. A cam shaft assembly is rotatably journaled to both of the inner and outer discs for actuating the pawl between the locked and unlocked positions. The cam shaft assembly comprises a cylindrical shaft and a cam. The cylindrical shaft has proximal and distal ends. An annular shoulder is formed in the cylindrical shaft disposed between the proximal and distal ends and extending radially outwardly from the shaft. An annular recess formed in the annular shoulder. A ramped surface extends from the annular recess and tapers towards the proximal end. The cam has a center bore and a plurality of teeth extending radially inwardly from the bore. The cam has a hardness greater than that of the shaft. The cam is press fit onto the shaft and locating axially against the annular shoulder, such that material scraped from the shaft during assembly of the cam onto the shaft is displaced into the annular recess to ensure the proper alignment of the cam against the annular shoulder of the shaft.

10 Claims, 3 Drawing Sheets

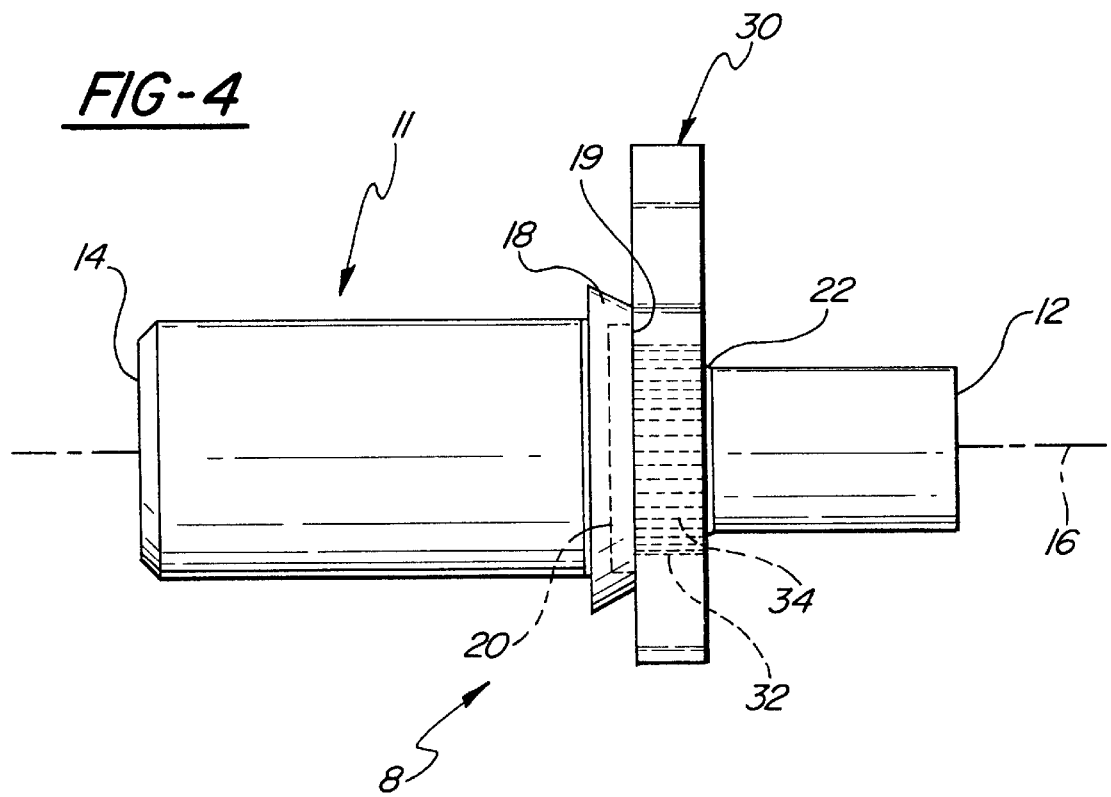
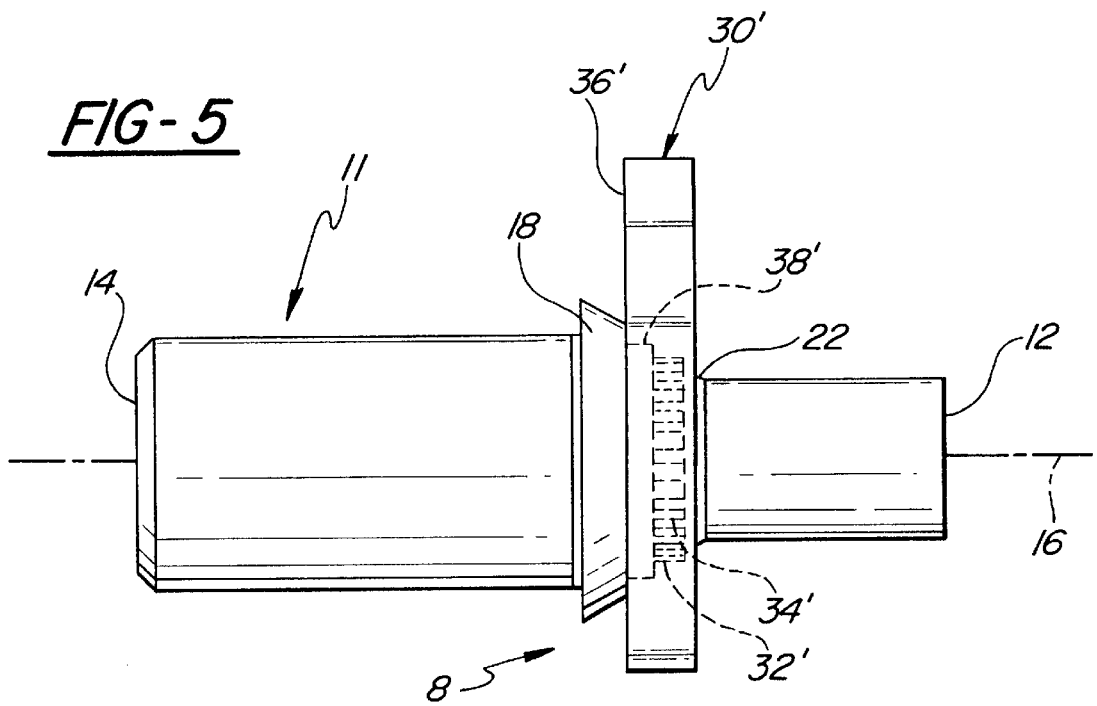

RECLINER ASSEMBLY HAVING A SHAFT WITH AN ANNULAR RECESS

BACKGROUND OF THE INVENTION

1. Field of the Invention

The subject invention relates to a recliner assembly comprising a cam and a shaft having an annular shoulder, and more particularly, to an annular recess formed in the annular shoulder of the shaft that ensures consistent alignment of the cam against the annular shoulder when the cam is mounted to the shaft.

2. Description of the Prior Art

Automotive vehicles include seat assemblies for supporting occupants in the vehicle. The seat assemblies commonly comprise a seat cushion and a seat back. Typically, a recliner assembly operatively interconnects the seat back to the seat cushion and allows for angular adjustment of the seat back relative to the seat cushion between a plurality of reclined positions.

Disc recliners are well known in the vehicle seating art and are commonly used to pivotally interconnect the seat back to the seat cushion. An example of such a recliner assembly is shown in PCT application CA 99/00653, published Feb. 10, 2000. Disc recliners typically include cylindrical inner and outer discs rotatably coupled to one another. The inner and outer discs are adapted for fixed attachment to the seat cushion and seat back, respectively. Disc recliners further include a locking mechanism for selectively interlocking the inner and outer discs. The locking mechanism typically comprises an annular rim of teeth on the outer disc. Several pawls, each with a plurality of teeth, are nested within the inner disc. The pawls are moveable in a radial direction between a locked position and an unlocked position. With the pawls in the locked position, the teeth on the pawls are interlocked with the rim of teeth on the outer disc to prevent rotation of the outer disc relative to the inner disc. When the pawls are moved from the locked position to the unlocked position, the outer disc is freely rotatable relative to the inner disc. Typically, an input shaft is rotatably journaled to both the inner and outer discs. The input shaft is moveable between an unreleased position and a released position. A cam is fixedly assembled, usually by a press fit, to the input shaft for actuating the pawls between the locked and unlocked positions when the shaft is rotated between the unreleased and released positions, respectively.

To ensure proper engagement of the cam and the pawls, it is important both for the cam not to rotate relative to the shaft during actuation of the input shaft and for the cam to be properly aligned on the shaft. Typically, the cam and shaft are fixedly assembled in a splined relationship to prevent rotation of the cam relative to the shaft. Further, the shaft often has a shoulder for locating and aligning the cam onto the shaft during assembly of the cam and shaft. However, when the cam is pressed onto the shaft, displaced material scraped from the shaft can prevent the cam from properly aligning against the shoulder of the shaft.

Accordingly, there is a need for a shaft design that prevents material from the shaft, displaced during assembly of the cam onto the shaft, from interfering with the proper alignment of the cam on the shaft.

SUMMARY OF THE INVENTION

This invention relates to a recliner assembly that operatively interconnects a seat back and a seat cushion and allows pivotal adjustment of the seat back relative to the seat cushion between a plurality of reclined positions. The seat recliner assembly comprises an inner disc adapted for fixed attachment to the seat cushion. An outer disc, adapted for fixed attachment to the seat back, is pivotally coupled with the inner disc. A locking means is nested between the inner and outer discs. The locking means is moveable between a locked state, wherein the outer disc is prevented from rotating relative to the inner disc, and an unlocked state, wherein the outer disc is freely rotatable relative to the inner disc. A cam, disposed between the inner and outer discs, actuates the locking means between the locked and unlocked states. An input shaft is fixedly assembled to the cam and is rotatably journaled to both of the inner and outer discs. The input shaft comprises an annular shoulder for axially locating the cam along the shaft. The input shaft further comprises an annular recess formed in the annular shoulder for receiving displaced material from the input shaft formed during assembly of the cam to the input shaft, thereby allowing the cam to properly align against the annular shoulder of the shaft.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a cross-sectional view of the cam and shaft assembly; and

FIG. 5 is a cross-sectional view of an alternative embodiment of the cam and shaft assembly.

DETAILED DESCRIPTION OF THE PREFERRED EMBODIMENT

Figure 1:
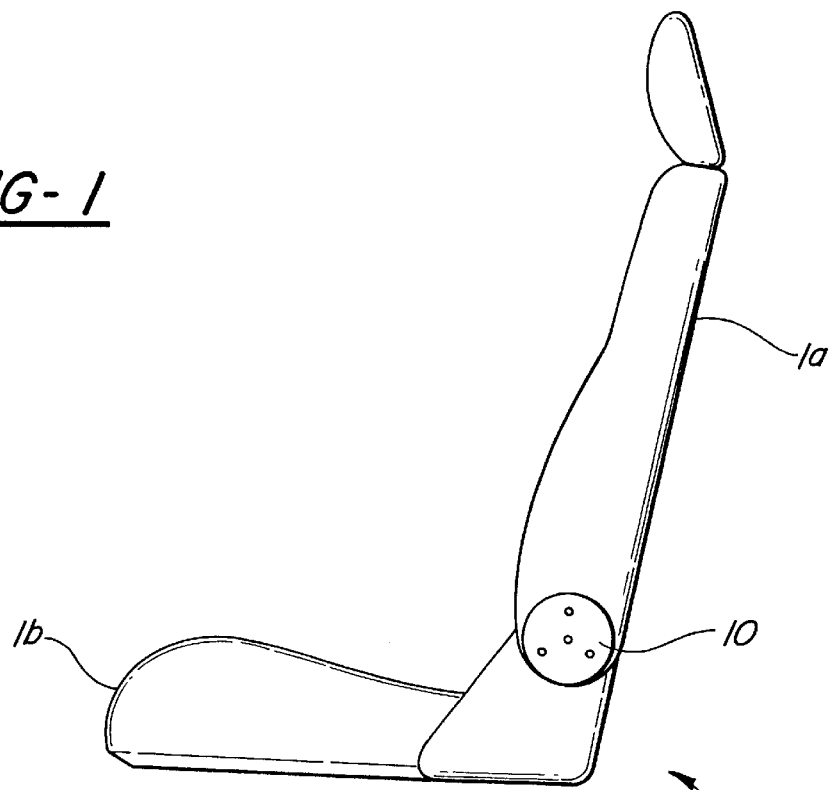
FIG. 1 is a side view of a vehicle seat having a recliner assembly according to the subject invention.

Referring to the figures, FIG. 1 discloses a vehicle seat 1 having a seat back 1a and a seat cushion 1b. A recliner assembly 10 operatively interconnects the seat back 1a to the seat cushion 1b to allow pivotal adjustment of the seat back 1a relative to the seat cushion 1b between a plurality of reclined positions about a longitudinal axis 16.

Figure 2:
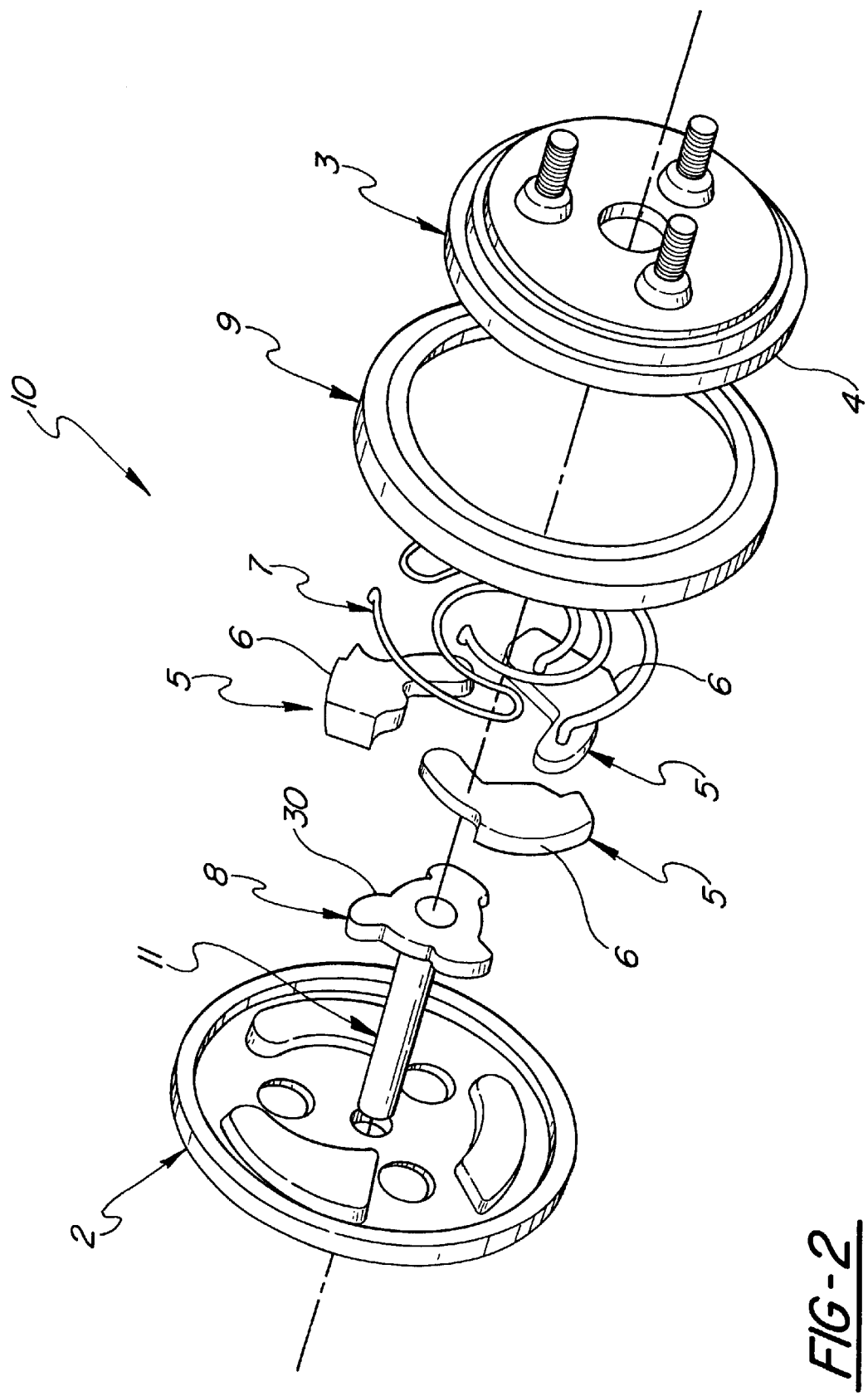
FIG. 2 is an exploded perspective view of the recliner assembly incorporating a cam and shaft assembly according to the subject invention.

Referring to FIG. 2, the recliner assembly 10 comprises an inner disc 2 adapted for fixed attachment to the seat cushion 1b. An outer disc 3 is pivotally nested within the inner disc 2 and is adapted for fixed attachment to the seat back 1a. An annular rim of gear teeth 4 is formed around the periphery of the outer disc 3 and extend radially inwardly. At least one pawl 5, disposed between the inner and outer discs 2, 3, is radially moveable between a locked position and an unlocked position. Gear teeth 6 are formed in the pawl 5 for lockingly engaging the annular rim of gear teeth 4 when the pawl 5 is in the locked position, thereby maintaining the angular position of the outer disc 3 relative to the inner disc 2. A biasing member 7 extends between the inner disc 2 and the pawl 5 for biasing the pawl 5 in the locked position. A cam shaft assembly 8 is rotatably journaled to both of the inner and outer discs 2,3 for actuating the pawl 5 between the locked and unlocked positions. A flanged ring 9 retains the outer disc 3 axially against the inner disc 2.

Figure 3:
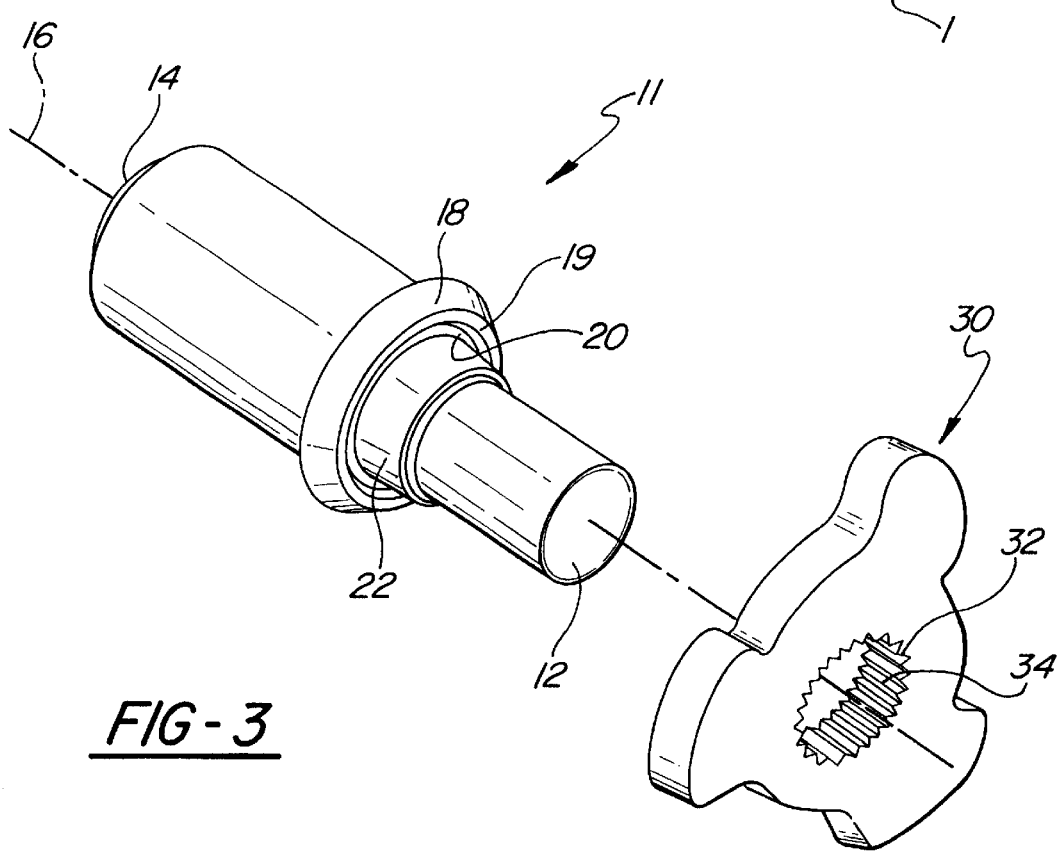
FIG. 3 is an exploded perspective view of the cam and shaft assembly.

Referring to FIG. 3, the cam shaft assembly 8 comprises a cylindrical shaft 11 having opposite proximal and distal ends 12, 14 and defining the longitudinal axis 16, therethrough. An annular shoulder 18, disposed between the proximal and distal ends 12, 14, extends radially outwardly from the shaft 11. The annular shoulder 18 comprises a locating surface 19 that is generally perpendicular to the longitudinal axis 16 and faces the proximal end 12. An annular recess 20 is formed in the locating surface 19. A ramped portion 22 extends from within the annular recess 20 and tapers towards the proximal end 12. The cam shaft assembly 8 further comprises a cam 30 having a center bore 32. A plurality of teeth 34 extend radially inwardly from the center bore 32. It should be appreciated that the hardness of the cam 30 is greater than the hardness of the shaft 11.

Referring to FIG. 4, the cam 30 is shown fixedly assembled to the shaft 11 adjacent to the locating surface 19. During assembly, the proximal end 12 of the shaft 11 is press fit through the center bore 32 of the cam 30. The cam 30 is pushed along the shaft 11 from the proximal end 12 towards the ramped portion 22. Once the cam 30 reaches the ramped portion 22, the teeth 34 cut into the ramped portion 22. Material from the ramped portion 22 of the shaft 11 is scraped and displaced by the teeth 34 towards and into the annular recess 20. The cam 30 aligns completely against the locating surface 19, as material from the ramped portion 22 of the shaft 11 is displaced into the annular recess 20, rather than between the locating surface 19 and the cam 30.

FIG. 5 discloses an alternative embodiment, wherein a cam 30' is fixedly assembled to the shaft 11 adjacent to the annular shoulder 18. The cam 30' includes a center bore 32' having a plurality of teeth 34' extending radially inwardly therefrom. The cam 30' further includes a locating face 36' for aligning the cam 30' against the annular shoulder 18. An annular recess 38' is formed in the locating face 36'. The annular recess 38' is generally coaxial with the center bore 32'. A ramped portion 22' extends from the annular shoulder 18 and tapers towards the proximal end 12. During assembly, the proximal end of the shaft is press fit through the center bore 32' of the cam 30'. The cam 30' is pushed along the shaft 11 from the proximal end 12 towards the ramped portion 22'. Once the cam 30 reaches the ramped portion 22', the teeth 34' cut into the ramped portion 22'. Material from the ramped portion 22' is scraped and displaced by the teeth 34' towards the annular shoulder 18. The locating face 36' of the cam 30' aligns completely against the annular shoulder 18, as displaced material from the ramped portion 22' of the shaft 11 accumulates within the annular recess 38', rather than between the locating face 36' and the annular shoulder 18.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A recliner assembly operatively interconnecting a seat back and a seat cushion of a seat assembly for allowing pivotal adjustment of the seat back relative to the seat cushion between a plurality of reclined positions, said recliner assembly comprising:

an inner disc adapted for fixed attachment to the seat cushion;

an outer disc adapted for fixed attachment to the seat back and pivotally coupled with said inner disc;

a locking member nested between said inner and outer discs for selectively locking said inner and outer discs, said locking member moveable between a locked state, wherein said outer disc is prevented from rotating relative to said inner disc, and an unlocked state, wherein said outer disc is freely rotatable relative to said inner disc;

a cam disposed between said inner and outer discs for actuating said locking member between said locked and unlocked states; and an input shaft fixedly assembled to said cam and rotatably journaled to both of said inner and outer discs, said input shaft comprising an annular shoulder for axially locating said cam along said shaft, said input shaft comprising an annular recess formed in said annular shoulder for receiving displaced material from said input shaft formed during assembly of said cam to said input shaft, thereby allowing said cam to properly align against said annular shoulder of said shaft.

2. The recliner assembly of claim 1 wherein said cam includes a star shaped center bore for receiving said input shaft.

3. The recliner assembly of claim 2 further comprising an annular ramped portion extending axially from said annular recess, said center bore of said cam displacing material from said annular ramped portion into said annular recess of said input shaft during assembly of said input shaft through said center bore of said cam, said ramped portion of said input shaft having a splined relationship with said center bore of said cam after said assembly of said cam against said annular shoulder of said input shaft.

4. The recliner assembly of claim 3 further comprising a biasing member for biasing said locking member in said locked state.

5. The recliner assembly of claim 1 wherein said annular shoulder includes a locating surface for locating said cam against said shoulder of said input shaft, said locating surface having said annular recess formed therein receiving displaced material from said input shaft formed during assembly of said cam to said input shaft, thereby allowing said cam to properly align against said annular shoulder of said shaft.

6. The recliner assembly of claim 5 further comprising a biasing member for biasing said locking member in said locked state.

7. A recliner assembly operatively interconnecting a seat back and a seat cushion for allowing pivotal adjustment of the seat back relative to the seat cushion between a plurality of reclined positions, said recliner assembly comprising:

an inner disc adapted for fixed attachment to the seat cushion;

an outer disc adapted for fixed attachment to the seat back and pivotally coupled with said inner disc;

a locking member nested between said inner and outer discs for selectively locking said inner and outer discs;

an input shaft rotatably journaled to both of said inner and outer discs, said input shaft having a radially outwardly extending annular shoulder; and a cam disposed between said inner and outer discs for actuating said locking member, said cam having a locating surface for locating said cam against said annular shoulder of said input shaft, said locating surface of said cam having an annular recess formed therein for receiving displaced material from said input shaft formed during assembly of said cam onto said input shaft, thereby allowing said cam to properly align against said annular shoulder of said shaft.

8. The recliner assembly of claim 7 wherein said cam includes a star shaped center bore for receiving said input shaft.

9. The recliner assembly of claim 8 further comprising an annular ramped portion extending axially from said input shaft, said center bore of said cam displacing material from said annular ramped portion into said annular recess during assembly of said input shaft through said center bore of said cam, said ramped portion of said input shaft having a splined relationship with said center bore of said cam after assembly of said cam against said annular shoulder of said input shaft.

10. The recliner assembly of claim 9 further comprising a biasing member for biasing said locking member in said locked state.

* * * * *